(12) United States Patent
Suciu et al.

(10) Patent No.: US 7,901,185 B2
(45) Date of Patent: Mar. 8, 2011

(54) VARIABLE ROTOR BLADE FOR GAS TURBINE ENGINE

(75) Inventors: Gabriel L. Suciu, Glastonbury, CT (US); Craig A. Nordeen, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1194 days.

(21) Appl. No.: 11/709,013

(22) Filed: Feb. 21, 2007

(65) Prior Publication Data
US 2008/0273976 A1 Nov. 6, 2008

(51) Int. Cl.
*B64C 11/44* (2006.01)
(52) U.S. Cl. ........ 416/155; 416/170 R; 416/DIG. 5
(58) Field of Classification Search ............ 415/130; 416/198 R, 170 R, 155, 162, DIG. 5
See application file for complete search history.

(56) References Cited

U.S. PATENT DOCUMENTS

| | | | |
|---|---|---|---|
| 3,840,309 A * | 10/1974 | Eckes et al. | 415/130 |
| 3,900,274 A * | 8/1975 | Johnston et al. | 416/155 |
| 3,986,794 A * | 10/1976 | Korn | 415/129 |
| 4,021,142 A | 5/1977 | Violette | |
| 4,053,256 A | 10/1977 | Hertel | |
| 4,124,330 A | 11/1978 | Barnes | |
| 4,619,580 A | 10/1986 | Snyder | |
| 4,750,862 A | 6/1988 | Barnes et al. | |
| 5,022,825 A | 6/1991 | Violette et al. | |
| 5,163,817 A | 11/1992 | Violette et al. | |
| 5,472,314 A | 12/1995 | Delonge et al. | |
| 5,595,474 A * | 1/1997 | Girard | 416/1 |
| 5,795,132 A | 8/1998 | Wheeler | |
| 6,015,264 A | 1/2000 | Violette et al. | |
| 6,179,559 B1 | 1/2001 | Weaver | |
| 6,305,905 B1 | 10/2001 | Nagle et al. | |
| 6,676,080 B2 | 1/2004 | Violette | |
| 6,745,558 B2 | 6/2004 | Murakami et al. | |
| 7,086,230 B2 | 8/2006 | Bayerl | |
| 7,503,750 B1 | 3/2009 | Violette | |
| 2006/0045728 A1 | 3/2006 | Martin et al. | |

* cited by examiner

*Primary Examiner* — Ninh H Nguyen
(74) *Attorney, Agent, or Firm* — Kinney & Lange, P.A.

(57) ABSTRACT

A variable rotor blade mechanism for use in a gas turbine engine comprises a blade rotor, a blade, a harmonic drive system, a stepper motor and a bracket. The blade rotor rotates absolutely about an axial engine centerline during operation of the gas turbine engine. The blade extends radially from the blade rotor and is configured to be adjustable by rotation about a radial axis. The harmonic drive system is mounted to the blade rotor and connected to the blade to rotate the blade about the radial axis. The stepper motor drives the harmonic drive with relative rotational input with respect to the absolute rotation of the blade rotor. The bracket is disposed about the engine centerline and supports the stepper motor stationary with respect to the rotation of blade rotor such that the relative rotational input to the stepper motor is generated.

20 Claims, 5 Drawing Sheets

VARIABLE ROTOR BLADE FOR GAS TURBINE ENGINE

BACKGROUND OF THE INVENTION

The present invention is related to gas turbine engines, and in particular to variable rotor blades and variable rotor blade actuation mechanisms.

Gas turbine engines operate by combusting fuel in compressed air to create heated gases with increased pressure and density. The heated gases are ultimately forced through an exhaust nozzle, which is used to step up the velocity of the exiting gases and in-turn produce thrust for driving an aircraft. In turbofan engines the heated gases are used to drive a turbine for rotating a fan to produce thrust, and to drive a turbine for driving a compressor that provides the compressed air used during combustion. The compressor section of a gas turbine engine typically comprises a series of rotor blade and stator vane stages. At each stage, rotating blades push air past the stationary vanes. Each rotor/stator stage increases the pressure and density of the air. Stators convert the kinetic energy of the air into pressure, and they redirect the trajectory of the air coming off the rotors for flow into the next compressor stage.

The speed range of an aircraft powered by a gas turbine engine is directly related to the level of air pressure generated in the compressor section. For different aircraft speeds, the velocity of the airflow through the gas turbine engine varies. Thus, the incidence of the air onto rotor blades of subsequent compressor stages differs at different aircraft speeds. Gas turbine efficiency is, therefore, closely linked to the ability of a gas turbine engine to efficiently direct air flow within the compressor section.

One way of achieving more efficient performance of the gas turbine engine over the entire speed range, especially at high speed/high pressure ranges, is to vary the pitch of the vanes to optimize the incidence of the airflow onto subsequent compressor stage blades. Conventional variable pitch compressor sections rely on variable stator vanes, as it is typically more feasible to include complex actuation mechanisms for stationary parts. Stator vanes are typically circumferentially arranged between stationary outer and inner diameter shrouds, which permits them to rotate about trunnion posts at their innermost and outermost ends to vary the pitch. Rotor blades, however, are only supported at their innermost end by the rotor disk, as the blade must rotate with the turbine shaft during operation of the engine. Thus, attempts at variable pitch compressor sections have typically been limited to variable stator vanes due to the complexity necessary for actuating a rotating blade, and to the heavy centrifugal loads placed on the blades during engine operation.

Another way of achieving more efficient compressor flow is to include variable camber blades and vanes. Blades and vanes comprise arcuate shaped bodies extending between a leading edge and a trailing edge. The amount of curvature of the body, or camber, affects the speed and trajectory of the air. Thus, variable camber blades provide an additional means for optimizing engine efficiency. However, due to the complexity of varying the shape of a body that must remain rigid under high stress while rotating, variable camber compressor sections have typically been impractical.

Thus, there is a need for variable pitch and variable camber rotor blades for gas turbine engines.

BRIEF SUMMARY OF THE INVENTION

The present invention is directed to a variable rotor blade mechanism for use in a gas turbine engine. The variable rotor blade mechanism comprises a blade rotor, a blade, a harmonic drive system, a stepper motor and a bracket. The blade rotor rotates absolutely about an axial engine centerline during operation of the gas turbine engine. The blade extends radially from the blade rotor and is configured to be adjustable by rotation about a radial axis. The harmonic drive system is mounted to the blade rotor and connected to the blade to rotate the blade about the radial axis. The stepper motor drives the harmonic drive with relative rotational input with respect to the absolute rotation of the blade rotor. The bracket is disposed about the engine centerline and supports the stepper motor stationary with respect to the rotation of blade rotor such that the relative rotational input to the stepper motor is generated.

DETAILED DESCRIPTION

Figure 1:
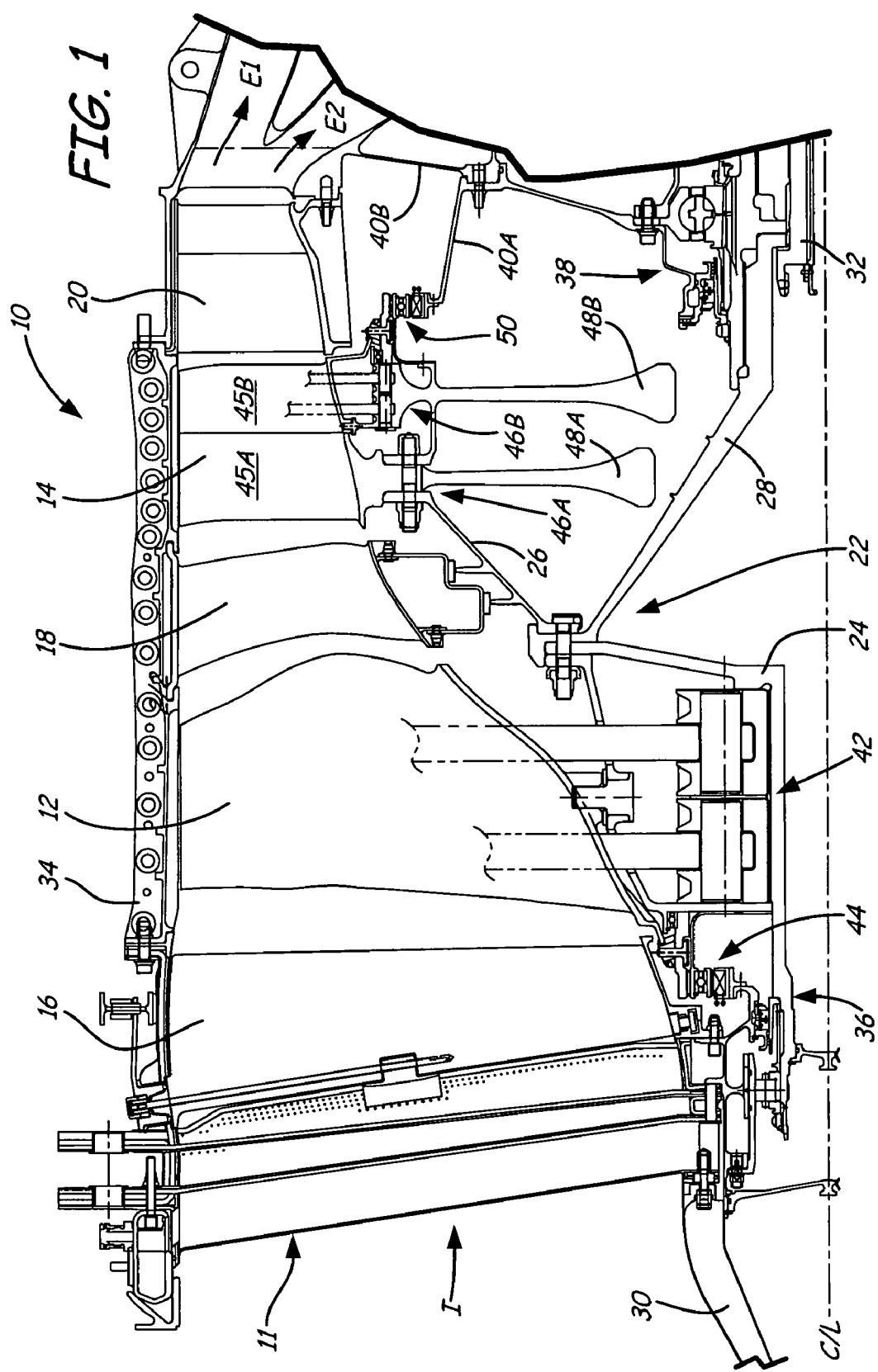
FIG. 1 shows a cross section of a fan section of a two-stage turbofan engine having variable rotors of the present invention used in conjunction with a variable pitch fan blade and a variable camber fan blade.

FIG. 1 shows a cross sectional view of two-stage turbofan engine 10. Engine 10 includes two-stage fan section 11, which includes variable pitch first-stage blade 12 and variable camber second-stage blade 14 inter-disposed between inlet guide vane 16, intermediate guide vane 18 and exit guide vane 20. Two-stage fan section 11 receives inlet air I, and produces both propulsive thrust output at exit E1 and compressed air used for combustion at exit E2. First-stage blade 12 and second-stage blade 14 are joined at their inner diameter ends to fan shaft 22, which is comprised of first-stage section 24, second-stage section 26 and conical support 28. Fan shaft 22 is connected with turbine shaft 32 at its aft end. Turbine shaft 32 is connected with a turbine at its aft end such that fan shaft 22 is driven to rotate about engine centerline CL. Guide vanes 16, 18 and 20 are fixedly attached to fan case 34 at their outer diameter ends. Inlet guide vane 16 is supported at its inner diameter end by bearing assembly 36, and exit guide vane 20 is supported at its inner diameter end by bearing assembly 38, through supports 40A and 40B. As turbine shaft 32 rotates fan shaft 22, first-stage blade 12 and second-stage blade 14 are rotated between guide vanes 16, 18 and 20. In order to optimize airflow through engine 10, first-stage blade 12 pivots about its radial axis to change its pitch, and second-stage blade 14 pivots about its radial axis to change its camber.

First-stage blade 12 is connected to first-stage shaft 24 of fan shaft 22 through first-stage radial retention system 42, which provides radial support to blade 12 while also permitting blade 12 to pivot about its radial axis. First-stage blade 12 is also connected to first-stage actuation mechanism 44, which provides rotational motion about centerline CL relative to shaft 32 such that first-stage blade 12 is pivoted about its radial axis. Thus, actuation mechanism 44 provides a means for varying the pitch of first-stage blade 12.

Second-stage blade 14 is a two-section blade comprising upstream blade section 45A and downstream blade section 45B. Second-stage blade 14 is connected to second-stage shaft 26 of fan shaft 22 through second-stage radial retention system 46A and second-stage radial retention system 46B. Second-stage radial retention system 46A comprises a bolted blade-to-disk connection for fastening upstream blade section 45A to shaft 26 through first disk 48A. Second-stage radial retention system 46B connects downstream blade section 45B to shaft 26 through second disk 48B. Second-stage radial retention system 46B is similar to that of first-stage radial retention system 42 in that it provides radial retention of blade section 45B while permitting it to rotate about its radial axis. Second-stage radial retention system 46B is connected to actuation mechanism 50, which is similar to actuation mechanism 44. Actuation mechanism 50 provides rotational motion about centerline CL relative to shaft 32 such that downstream blade section 45B is pivoted about its radial axis on disk 48B. Accordingly, the relative rotation of downstream blade section 45B to upstream blade section 45A provided by actuation mechanism 50 changes the camber of second-stage blade 14.

First-stage blade 12 and second-stage blade 14 thus include mechanisms for varying the airflow through engine 10 to optimize engine performance. For example, engines are typically designed to operate most efficiently at a design point. The design point contemplates a typical engine operating scenario, typically a highly fuel-efficient cruising speed, at which point the engine components will function to operate the turbine engine at peak efficiency. However, all gas turbine engines must operate above and below the design point, such as during takeoff and landing, and thus must necessarily operate at below optimal efficiency. However, engine efficiency can be partially, if not wholly, restored to near peak operating conditions by varying the airflow through the engine, particularly the fan and compressor sections. Inlet air enters fan section 11 at inlet I. Engine airflow is adjusted by varying the pitch and camber of the compressor blades. Actuation mechanisms 44 and 50, along with radial retention systems 42, 46A and 46B, provide the means by which first-stage blade 12 and second-stage blade 14 are enabled to adjust airflow through fan section 11. Accordingly, inlet air exits fan section 11 at optimal velocity and pressure to provide thrust or to supply a combustion process, such as at exits E1 and E2, respectively.

Figure 2:
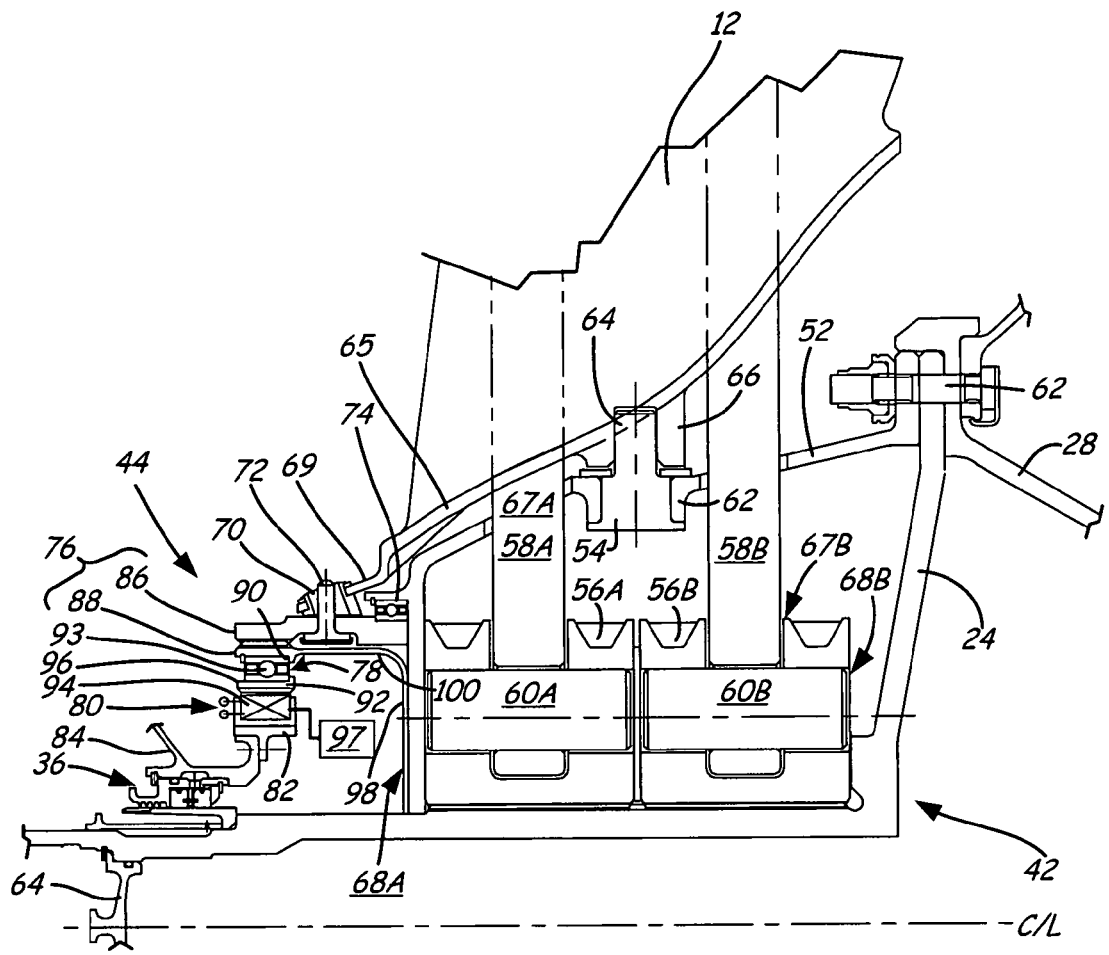
FIG. 2 shows a close-up view of an actuation mechanism for the variable pitch fan blade of FIG. 1.

FIG. 2 shows a close-up view of actuation mechanism 44 for variable pitch fan blade 12 of FIG. 1. First-stage blade 12 is connected to first-stage shaft 24 through inlet radial retention system 42, which comprises vane hub 52, pivot pin 54, first hub 56A, second hub 56B, first u-strap 58A, second u-strap 58B, first retainer 60A and second retainer 60B. Shaft 24 is supported at its downstream end by conical support 28 and at its upstream end by support 64. Shaft 24, Shaft 28 and support 64 rotate in unison about centerline CL during operation of engine 10. The inner diameter of first-stage blade 12 is connected to and radially pivots about hub 52 on pivot pin 54. Thus, hub 52 comprises a rotor or disk member for receiving a plurality of first-stage blades about its circumference. Pin 54 is inserted into bore 62 on hub 52 such that pin shaft 64 is inserted into hub 66 of blade 12. Hub 52 is secured to first-stage shaft 24 with fastener 62 such that hub 52, pivot pin 54 and blade 12 rotate about centerline CL with shaft 24 during operation of engine 10. Engine 10 reaches high rotational speeds during operation, resulting in blade 12 being subjected to significant centrifugal force and tensile stress. Thus, blade 12 is further secured to shaft 24 with first-stage radial retention system 42.

U-straps 58A and 58B comprise flexible straps that connect the main body of blade 12 with shaft 24 such that hub 52 and pin 54 are relieved of providing primary radial retention of blade 12. First hub 56A and second hub 56B are secured to shaft 24 in any conventional manner sufficient to restrain radial and axial movement of first hub 56A and second hub 56B. In one embodiment, hubs 56A and 56B are welded to shaft 24. In another embodiment, hubs 56A and 56B are connected to shaft 24 with threaded fasteners. Hubs 56A and 56B include radially outward opening apertures 67A and 67B for receiving u-straps 58A and 58B, respectively. Hubs 56A and 56B also include tangential opening apertures 68A and 68B for receiving retainers 60A and 60B, respectively. Retainers 60A and 60B include posts (not sown) around which u-straps 58A and 58B are looped such that the ends of u-straps 58A and 58B are available for connection to the body of blade 12. Thus, a first end of u-strap 58A is secured to a first interior side of blade 12 and a second end of u-strap 58A is secured to a second interior side of blade 12, with the length of u-strap 58A looped around the post of retainer 60A. U-strap 58B is connected to blade 12 and retainer 60B in a similar manner. Retainers 60A and 60B are inserted into tangentially opening apertures 58A and 58B in hubs 56A and 56B such that u-straps 58A and 58B extend through radially outward opening apertures 57A and 57B. Retainers 60A and 60B interlock with hubs 56A and 56B such that radial movement of retainers 60A and 60B is restricted. Hubs 56A and 56B include adjusting mechanisms such that the position of retainers 60A and 60B are adjusted within hubs 56A and 56B. Thus, the tension of u-straps 58A and 58B is adjustable to provide tensile support to blade 12 and retainers 60A and 60B are prevented from withdrawing from hubs 56A and 56B. Additional secondary means can also be provided to immobilize retainers 60A and 60B within hubs 56A and 56B, such as threaded fasteners. U-straps 58A and 58B comprise bands of flexible material that have good tensile strength properties. As such, u-straps 58A and 58B provide radial support to blade 12, yet also permit blade 12 to rotate about shaft 64 of pin 54.

Blade 12 is connected to actuation mechanism 44 such that blade 12 is rotated about pin 54. Blade 12 includes platform 65, hub 66 and actuation arm 69, which includes bore 70. Actuation mechanism 44 includes actuation pin 72, first bearing assembly 74, harmonic drive 76, second bearing assembly 78, stepper motor 80 and support 82. Support 82 is mounted to bracket 84, which is mounted such that it is stationary within engine 10. Bracket 84 is supported at its outer diameter end by inlet guide vane 16 and fan case 34, and extends inward towards centerline CL where it is supported by bearing assembly 36 at its inner diameter end. Thus, shaft 24 is permitted to rotate beneath bracket 84 by bearing assembly 36. Stepper motor 80 is supported by bracket 84 through support 82 such that they are fixed within engine 10 so as to not rotate with shaft 24. Second bearing assembly 78 is disposed between stepper motor 80 and harmonic drive 76. Harmonic drive 76, first bearing assembly 74 and pin 72 are supported by hub 52 such that they rotate with shaft 24. Harmonic drive 76 includes output spline/rigid gear 86, inner spline/flexible gear 88; second bearing assembly 78 includes outer race 90, inner race 92 and bearings 93; and stepper motor 80 includes stator coil 94 and rotor 96.

Stepper motor 80 comprises an electric motor that produces incremental rotational output. Stepper motor 80 converts electrical digital pulse inputs to a predetermined rotational step of the output shaft—rotor 96. Between impulses, stepper motor 80 holds its positions such that stator coil 94 and rotor 96 are locked in position with respect to each other, without the assistance of additional brake or clutch mechanisms. Accordingly, the position of rotor 96 with respect to stator coil 94 can be accurately controlled and recorded with, for example, digital controller. Thus, rotor 96 rotates about coil 94 in a controlled manner. Inner race 92 of second bearing assembly 78 is connected to rotor 96 and outer race 90 is connected to inner spline/flexible gear 88. Bearings 93 are positioned between inner race 92 and outer race 90 such that rotor 96 is free to rotate within inner spline/flexible gear 88. As mentioned above, hub 52 rotates about centerline CL such that flexible gear 88 also rotates about centerline. Flexible gear 88 includes gear teeth that mesh with gear teeth of rigid gear 86. Rigid gear 86 is supported by flexible gear 88 through the meshed gear teeth at its inner diameter, and by first bearing assembly 74 at its outer diameter. Actuation pin 72 is inserted through a bore in rigid gear 86 and into bore 70 of actuation arm 68 of vane 12. Thus, rigid gear 86 is not connected to hub 52 or shaft 24, but is rotated about centerline CL at the speed of shaft 24 through its connection with actuation pin 72 and flexible gear 88. Actuation pin 72 is inserted into hub 66 of vane 12 so that vane 12 rotates about pin shaft 64 as rigid gear 86 is rotated between first bearing assembly 74 and second bearing assembly 78. Rigid gear 86 is rotated through its interaction with flexible gear 88 and stepper motor 80.

Flexible gear 88 comprises a flexible band, comprising vertical portion 98 and horizontal portion 100, to which its gear teeth are attached. Vertical portion 98 is rigidly mounted to hub 52 such that it rotates with hub 52. Horizontal portion 100 extends axially from vertical portion 98 such that its gear teeth can interact with that of rigid gear 86. Thus, horizontal portion 100 is cantilevered such that it is free to flex in the radial direction. Flexible gear 88 circumscribes second bearing assembly 78 and rotor 96 of stepper motor 80. The outer diameter of rotor 96 is elliptical in shape such that flexible gear 88 also takes on an elliptical shape when rotor 96 is inserted into flexible gear 88. Rigid gear 86 circumscribes flexible gear 88 such that their teeth mesh. Rotor 96 rotates within flexible gear 88 to deform the profile of flexible gear 88. As flexible gear 88 deforms, its teeth engage with the teeth of rigid gear 86 to cause rotation of rigid gear 86 in the same direction as rotor 96. Thus, flexible gear 88 adjusts the relative position of rigid gear 86 around centerline CL with respect to hub 52. The relative rotational adjustment of rigid gear 86 pushes and pulls actuation arm 69 through pin 72, thus adjusting the pitch of blade 12. The operation of actuation mechanism 44 is further illustrated in FIG. 3.

Figure 3:
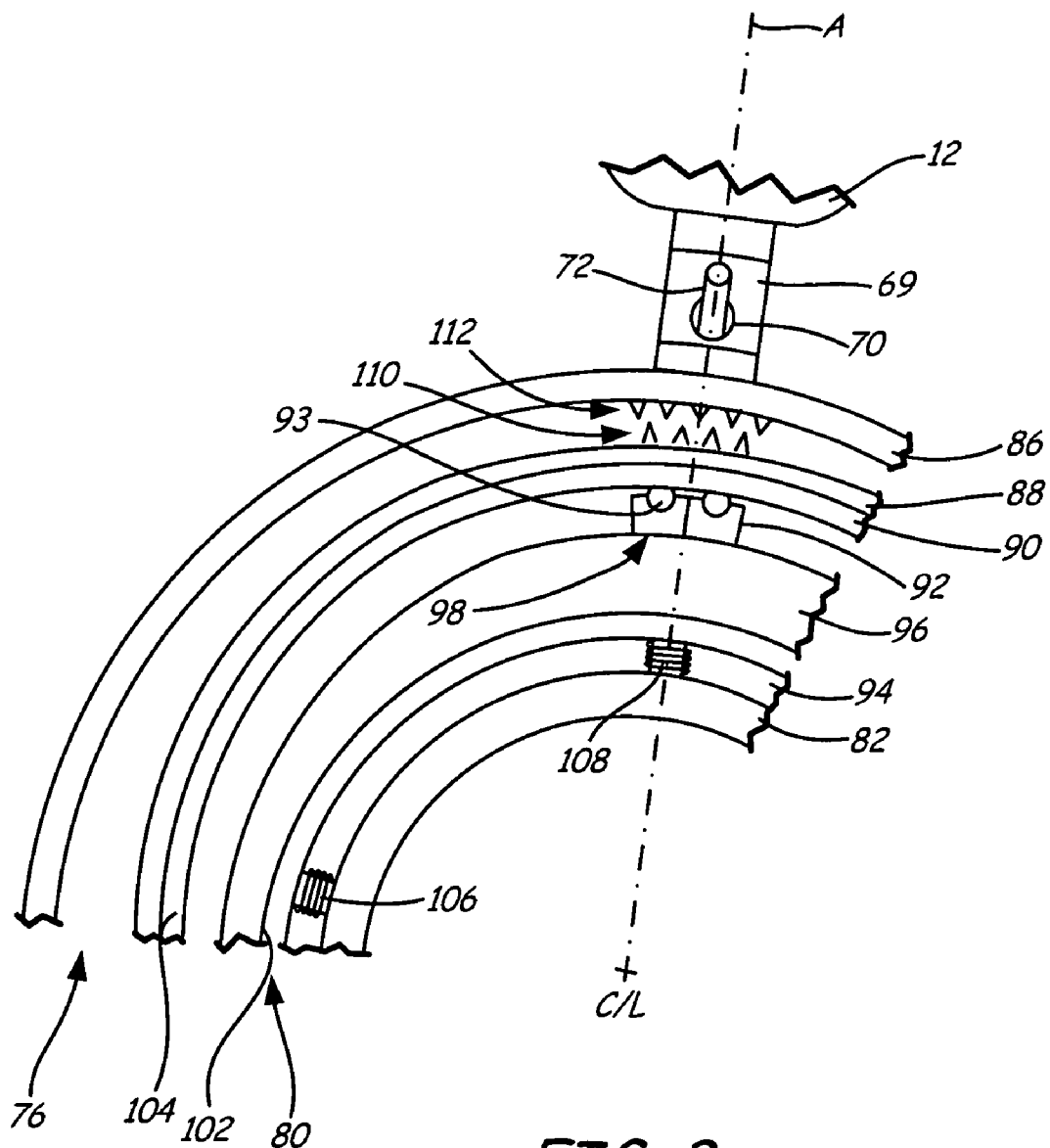
FIG. 3 shows a schematic front view of the actuation mechanism of the variable pitch fan blade of FIG. 2.

FIG. 3 shows a partial, schematic front view of actuation mechanism 44 of FIG. 2. Actuation mechanism 44, which provides rotational movement to actuation arm 69 to adjust the pitch of blade 12, includes harmonic drive 76 and stepper motor 80. Stepper motor 80, which includes coil 94 and rotor 96, is positioned about centerline CL within engine 10. Stepper motor 80 is hereinafter described as a permanent magnet stepper motor, however other types of stepper motors, such as variable reluctance and hybrid motors, may also be used. Stepper motor 80 is mounted to support 82 such that coil 94 is held stationary as engine 10 operates. Support 82 comprises a cylindrical support around which coil 94 is mounted. Coil 94 comprises a circular hoop made up of conductive windings through which electrical input current is passed in order to generate an electromagnetic field.

Rotor 96, which is comprised of permanent magnet material, includes inner surface 102, which has a circular profile, and outer surface 104, which has an elliptical profile. Rotor 96 is disposed about centerline CL such that inner surface 102 surrounds coil 94. Coil 94 receives digital pulses from controller 97 such that rotor 96 is rotated through the electromagnetic interaction of coil 94 and rotor 96. The operation of stepper motors is commonly known and a detailed explanation need not be included here. It is, however, important to note that the various embodiments of stepper motors include toothed interactions such that the rotor rotates in a "stepped" fashion. Thus, a simplified explanation of stepper motor 80 is provided. Rotor 96 comprises a permanent magnet such that it has north pole N and a diametrically opposed south pole, which is not shown. Coil 94 includes four teeth that are spaced at each quadrant of coil 94. For example, coil 94 includes first tooth 106 and second tooth 108, which include conductive coil windings. The four teeth are energized in sequence to cause rotation of rotor 96 as pole N is attracted to each tooth as it is energized. Thus, the rotation of rotor 96 can be incrementally controlled by the sequence of energizing each tooth. Once rotor 96 is rotated to the desired position, it is held in place by the continuous energizing of the tooth closest to pole N. The number of toothed interactions controls the incremental or "stepped" rotation of rotor 96. Various stepper motors have various numbers of teeth. In variable reluctance motors, for example, rotors typically have about twelve teeth and stators have about nine teeth, which results in about five to about fifteen degree step increments. In hybrid motors, both the rotor and the stator have, for example, about twenty-four teeth, resulting in stepped increments of about 1.8 degrees. Rotor 96 comprises a stepper motor having ninety-degree steps due to the four quadrant-positioned teeth. However, through the gear reduction of harmonic drive 76, rigid gear 86 is rotated much less than ninety degrees.

Harmonic drive 76 comprises flexible gear 88, which includes teeth 110. and rigid gear 86, which includes teeth 112. Teeth 110 and teeth 112, only a segment of which are shown in FIG. 3, extend around the entire circumferences of rigid gear 86 aid flexible gear 88. Again, the specifics of harmonic drives are well known to those skilled in the art and the details need not be elaborated on here. However, a description of harmonic drive 76 is provided so that the workings of the present invention are readily understood. Flexible gear 88 is wrapped around rotor 96 through second bearing assembly 78. Bearing assembly 78 includes outer race 90, inner race 92 and bearings 93. Inner race 92 is secured to outer surface 104 of rotor 96 such that it takes on the elliptical shape of rotor 96. The eccentricity of outer surface 104 is exaggerated in FIG. 3 for clarity. In actuality, the eccentricity of outer surface 104 is slight such that it is nearly circular. Bearings 93, of which only two are shown, encircle rotor 96 and are configured for rolling in inner race 92. Outer race 90 encircles bearings 93 and retains bearings 93 within bearing assembly 78. Outer race 90 is flexible and abuts inner diameter surface of flexible gear 88. As rotor 96 is driven by coil 94, the major axis of rotor 96 rotates about centerline CL causing a deformation of outer race 90 and flexible gear 88. Thus, flexible gear 88 comprises an ellipse that is concentrically disposed within circular rigid gear 86. Accordingly, flexible gear 88 engages rigid gear 86 at two regions, one of which is at pole N between teeth 110 and teeth 112. The other region being at the south pole. Rotor 96 rotates at the speed of stepper motor 80, but flexible gear 88 is rotated according to the interaction of teeth 110 with teeth 112. The number of teeth comprising teeth 110 is two less than the number of teeth comprising teeth 112. Thus, for one revolution of rotor 96, the position of rigid gear 86 with respect to flexible gear 88 shifts by two teeth. Since flexible gear 88 is maintained relatively stationary (flexible gear 88 rotates about centerline CL during operation of engine 10), one revolution of rotor 96 causes a shift in position of rigid gear 86 in the same direction. Thus, harmonic drive 76 provides a high input/output ratio such that significant rotation of rotor 96 results in only a small movement of rigid gear 86, as the pitch of blade 12 need only be slightly adjusted. For example, gear ratios of approximately 100:1 can be achieved with harmonic drive 76.

Blade 12 is connected to rigid gear 86 through a pinned connection. FIG. 3 only shows a single blade for simplicity. Engine 10, however, comprises an array of fan blades disposed radially about shroud 52, each of which is similarly connected to rigid gear 86. Pin 72 is extended through rigid gear 86 such that its shaft extends radially from rigid gear 86. Actuator arm 69 extends axially from blade 12 such that bore 70 engages with pin 72. Blade 12 is disposed radially about shroud 52 on pin 54 (as seen in FIG. 2) such that it is rotatable about axis A. Pin 72 rotates about centerline CL as rigid gear 86 is rotated by flexible gear 88. Actuator arm 69 is correspondingly rotated about pin 72 at bore 70. Bore 70 is elliptically shaped such that it permits rotation of actuator arm 69 about axis A as bore 70 moves axially along centerline CL. However, bore 70 also maintains interaction between actuator pin 72 and actuator arm 69 such that movement of rigid gear 86 translates into precise movement of actuator arm 69.

Operation of actuation mechanism 44 can be carried out in several manners. Bracket 82 and coil 94 are rigidly fixed within engine 10 such that they cannot rotate about centerline CL. Rigid gear 86 and flexible gear 88 are connected with shroud 52 such that they always rotate with shaft 24 during operation of engine 10. Rotation of rotor 96 about centerline CL is, however, controlled electrically by coil 94. Rotor 96 is disposed between coil 94 and flexible gear 88 such that it can be driven by coil 94 to rotate about centerline CL, or can be locked by coil 94 to stay stationary about centerline CL. Alternatively, movement of rotor 96 can be mechanically controlled through its linkage with flexible gear 88 and rigid gear 86. When power to coil 94 is stopped, rotor 96 will mechanically rotate with flexible gear 88, as flexible gear 88 becomes bound with rigid gear 86 maintaining the two areas of elliptical contact between rotor 96 and flexible gear 88 constant. Specifically, as shaft 24 of engine 10 rotates about centerline CL, rigid gear 86 is pulled along by the interaction of teeth 110 with teeth 112, and by the interaction of actuator arm 69 with pin 72. Thus, flexible gear 88 is locked with rigid gear 86 and there is enough friction between flexible gear 88, bearing assembly 78 and rotor 96 to drag rotor 96 along with flexible gear 88 because stator coil 94 provides no resistance to rotor 96. Thus, rotor 96 can be electrically or mechanically rotated about centerline CL such that relative motion between rigid gear 86 and flexible gear 88 is eliminated and rotation of blade 12 about axis A is held constant.

Rotor 96 can be driven in either of two manners to adjust the pitch of blade 12 about axis A. In one embodiment, power to coil 94 can be ceased such that rotor 96 rotates with flexible gear 88 about centerline CL. Power can then be intermittently supplied to coil 94 to cause rotation of rotor 96 relative to flexible gear 88. Thus, stepper motor 80 supplies enough torque to rotor 96 to overcome the friction between rotor 96, bearing assembly 78 and flexible gear 88. Power is supplied to coil 94 in controlled, discrete increments such that the movement of rotor 96 induced by coil 94 is known. Thus, the correlated movement of blade 12 about axis A is also known. Thus, in conjunction with other systems of engine 10, such as controller 97, flight control systems, fuel supply systems and the like, operation of engine 10, and specifically airflow through fan section 11, can be controlled. For example, greater airflow capacity, greater engine efficiency and greater engine operability are achieved by varying the flow through fan section 11 with variable pitch blade 12 of the present invention.

Likewise, in another embodiment of the invention, airflow through fan section 11 can be controlled by actively driving stepper motor 80. Rotation of rotor 96 can be controlled by actively supplying power to coil 94 to drive rotor 96 at the speed flexible gear 88 rotates about centerline CL during operation of engine 10. Thus, rotor 96 can be driven to advance in the direction of rotation of flexible gear 88 to cause adjustment of blade 12 in one direction. Conversely, rotor 96 can be back-driven to slow the rotation of rotor 96 in the direction of rotation of flexible gear 88 to cause adjustment of blade 12 in a second direction. As in the previous embodiment, the advancement and retreat of rotor 96 is precisely controlled to cause known movements of blade 12 such that airflow through fan section 11 is controlled. Additionally, actuation of second-stage blade 14 is similarly controlled by actuation mechanism 50.

Figure 4:
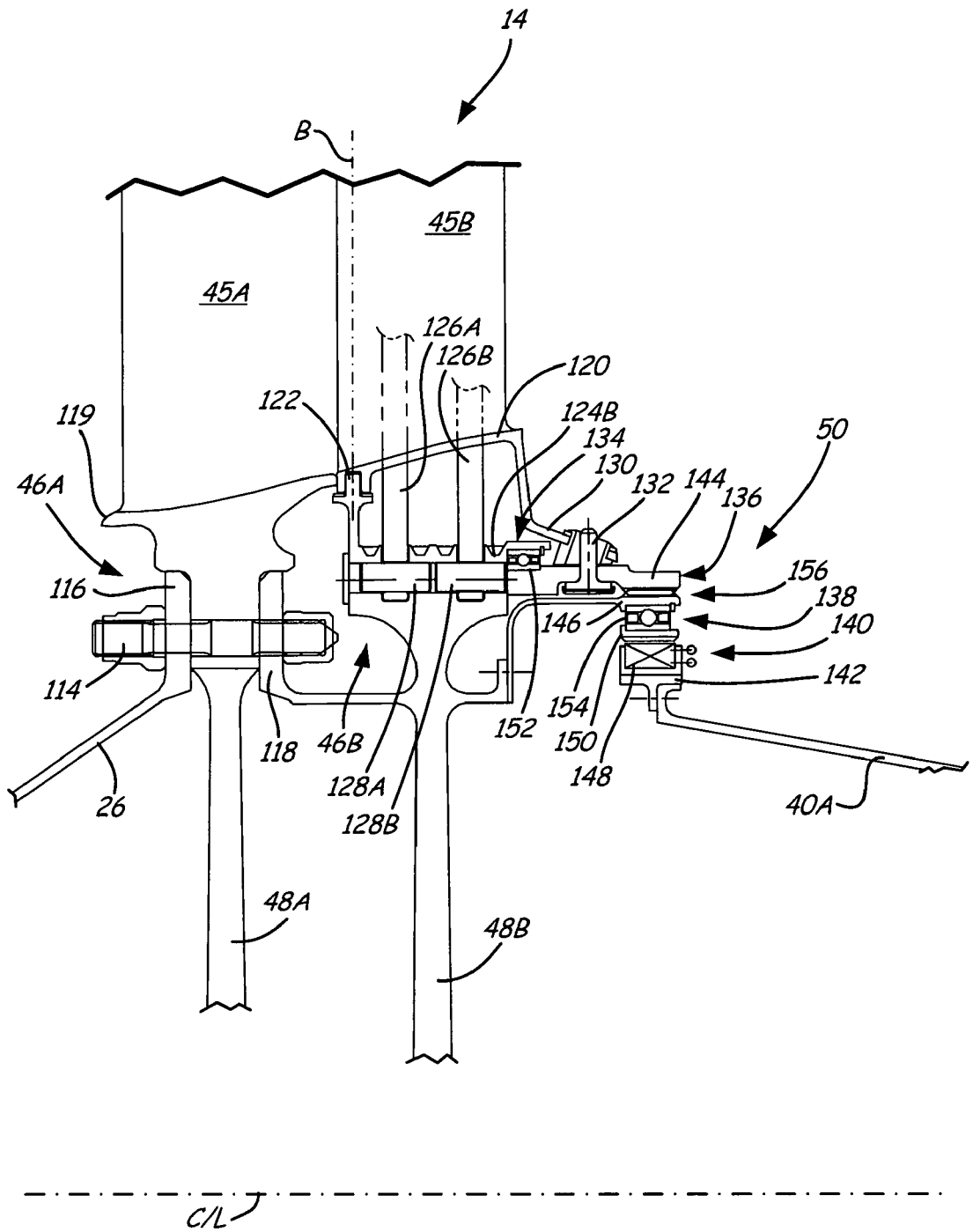
FIG. 4 shows a close-up view of an actuation mechanism for the variable camber fan blade of FIG. 1.

FIG. 4 shows a close-up view of actuation mechanism 50 for variable camber fan blade 14 of FIG. 1. The camber of blade 14 is adjusted with actuation mechanism to adjust airflow through fan section 11. Blade 14 is comprised of upstream blade section 45A, which is mounted to fan disk 48A, and downstream blade section 45B, which is mounted to fan disk 48B. Fan disks 48A and 48B are connected to each other and to second-stage section 26 of shaft 24 through second-stage radial retention system 46A. Threaded fastener 114 passes through flange 116 of fan disk 48A, fan disk 48A and flange 118 of fan disk 48B such that fan disks 48A and 48B rotate in unison with second-stage section 26 and fan shaft 24. Upstream blade section 45A, including platform 119, is integrally formed with or otherwise connected with fan disk 48A such that upstream blade section 45A is restrained from radial movement.

Downstream blade section 45B is restrained from radial movement through second-stage radial retention system 46B. Second-stage radial retention system is configured such that downstream blade section 45B is permitted to rotate about its radial axis at the outer circumference of fan disk 48B. Second-stage radial retention system 46B comprises vane platform 120, pivot pin 122, fist hub 124A, second hub 124B, first u-strap 126A, second u-strap 126B, first retainer 128A and second retainer 128B. Second-stage radial retention system 46B is configured similarly to first-stage radial retention system 46A. For example, flexible u-straps 126A and 126B are looped around posts within retainers 128A and 128B, which are then inserted into tangentially opening apertures within hubs 124A and 124B. The ends of u-straps 126A and 126B are connected to either side of blade 14. Thus, hubs 124A and 124B restrain radial movement of retainers 128A and 128B, which restrain radial movement of u-straps 126A and 126B. U-straps 126A and 126B restrain radial movement of blade 14, but also permit blade 14 to rotate about pivot pin 122 on vane platform 120 through actuation mechanism 50.

Actuation mechanism 50 includes actuation arm 130, actuation pin 132, first bearing assembly 134, harmonic drive 136, second bearing assembly 138, stepper motor 140 and support 142. Support 142 is mounted to bracket 40A, which is mounted such that it is stationary within engine 10. Stepper motor 140 and second bearing assembly 138 are supported by bracket 40A through support 142 such that they are fixed within engine 10 so as to not rotate with shaft 24. Harmonic drive 136, first bearing assembly 134 and pin 132 are supported by platform 120 such that they rotate with shaft 24. Harmonic drive 136 includes output spline/rigid gear 144, inner spline/flexible gear 146; and stepper motor 140 includes stator coil 148 and rotor 150.

Actuation mechanism 50 operates in a similar fashion as actuation mechanism 44 to rotate downstream blade section 45B about axis B. Rigid gear 144, flexible gear 146, actuation arm 130 and section 45B rotate about centerline CL during operation of engine 10. Actuation mechanism 50 rotates rigid gear 144 relative to flexible gear 146 about centerline CL to move actuation arm 130 through pin 132. Actuation arm 130 is connected to platform 120 such that downstream blade section 45B is rotated about axis B on pin 122 when actuation arm 130 is manipulated by rigid gear 144. Rigid gear 144 is supported within engine 10 between bearing assembly 152 and flexible gear 146. Flexible gear 146 is rigidly connected to fan disk 48B such that it rotates with shaft 24, and is supported by bearing assembly 154. Bearing assembly 154 is mounted to rotor 150 of stepper motor 140. Rotor 150 has an elliptical outer profile such that it rotates within bearing assembly 154 to deform flexible gear 146 in such a fashion as to rotate rigid gear 144 through toothed connection 156, in a manner similar to as what was described with respect to actuation mechanism 44. Rotor 150 has a circular inner profile such that rotor 150 is rotatable about coil 148. Rotor 150 and coil 148 have a toothed interface such that they comprise stepper motor 140. Stepper motor 140 may be any suitable type of stepper motor (e.g. permanent magnet, variable reluctance or hybrid) such that rotor 150 can be rotated about coil 94 in a controlled, incremental fashion. As such, stepper motor 140 can be driven in any of the manners described with respect to stepper motor 80 to manipulate the position of rigid gear 144 with respect to that of flexible gear 146. Accordingly, the rotation of downstream blade section 45B about axis B is precisely actuated to vary the camber of blade 14 and to control airflow through fan section 11. Thus, in conjunction with variable pitch blade 12 of FIG. 2, a plurality of variable pitch blades 12 and a plurality of variable camber blades 14 are disposed within engine 10 to control airflow through fan section 11.

Figure 5:
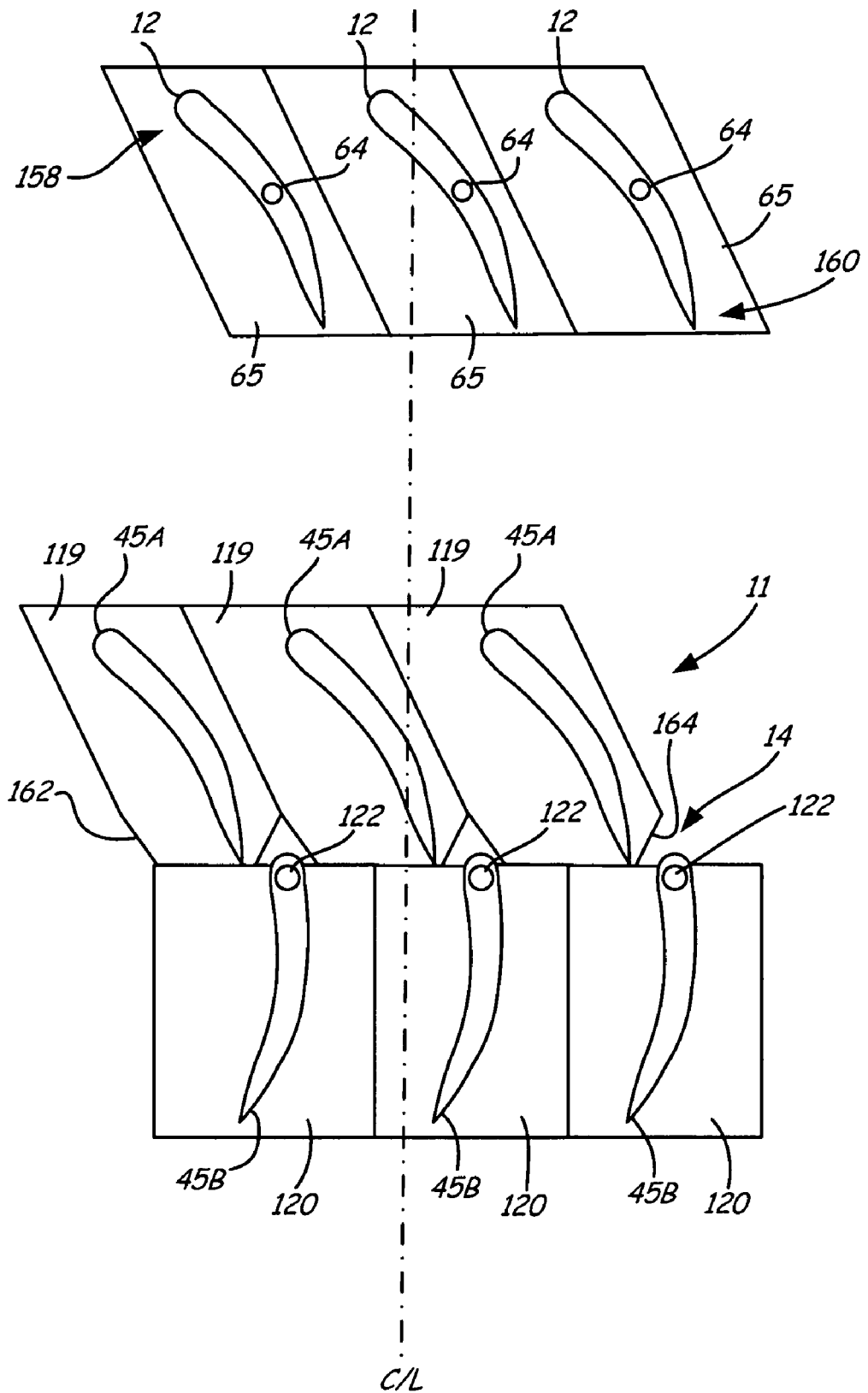
FIG. 5 shows a schematic top view of the fan section of FIG. 1 showing the variable pitch fan blade of FIG. 2 and the variable camber fan blade of FIG. 4.

FIG. 5 shows a schematic top view of fan section 11 of FIG. 1, showing variable pitch fan blades 12 of FIG. 2 and variable camber fan blades 14 of FIG. 4. Stator vanes 18, which are disposed between blades 12 and blades 14 within engine 10 (see FIG. 1), have been omitted for simplicity. Fan blades 12 are disposed within engine 10 such that they extend generally in the direction of centerline CL from leading edge 158 to trailing edge 160. Fan blades 12 are configured for rotation about pivot pins 64 on platforms 65. Fan blades 14 are disposed generally in the direction of centerline CL within engine 10, with upstream blade sections 45A forming the leading edge of each blade 14, and downstream blade sections 45B forming the trailing edge of each blade 14. Downstream blade sections 45B are configured for rotation about pivot pins 122 on platforms 120, while upstream blade sections 45A fixedly extend from platforms 119. In various embodiments, engine 10 includes about thirty to about forty of first-stage blades 12 and second-stage blades 14 disposed circumferentially about shaft 24 and rotors 48A and 48B, respectively.

During operation of engine 10 air enters fan section 11 at leading edge 158 of variable pitch blades 12, travels past stator vanes 18, and on through variable camber blades 14. In order to maximize performance of engine 10, blades 12 are rotated about pivot pins 64 and downstream blade sections 45B are rotated about pivot pins 122. For example, engine surge is a potential problem during operation of engine 10. Surge occurs when pressure is lost within engine 10, such as at fan section 11, resulting in a reversal of the airflow within engine 10. As such, there is the potential for engine stall and for burning fuel to flow forward within engine 10. It is, however, most fuel efficient to operate engine 10 close to the surge point. It is desirable to maintain the surge margin as small as possible during all operating conditions of engine 10. The surge margin of engine 10 can be maintained at desirable low levels by changing the pitch of blades 12 and the camber of blades 14, utilizing actuation mechanisms 44 and 50 as described above.

Variable pitch blades 12 are rotated about pivot pins 64 to control the surge margin. For example, when engine 10 is started blades 12 are rotated such that airflow through variable pitch blades 12 is partially closed, as only small amounts of air are required for combustion. As engine 10 is brought up to speed and during operation of engine 10, variable pitch blades 12 are opened up to let additional airflow through to the combustors. When electronic engine controls detect an impending surge, variable pitch blades 12 are rotated to close airflow through blades 12. Thus, actuation of variable pitch blades 12 is integrated with full-authority, digital electronic control systems of engine 10 to coordinate operation of engine 10.

Likewise, actuation of variable camber blades 14 is coordinated with the full-authority, digital electric control system of engine 10. Downstream blade sections 45B are rotated about pivot pins 122 to control the surge margin within engine 10. Downstream blade sections 45B are positioned downstream of upstream blade sections 45A such that together they form an airfoil body. Downstream blade sections 45B are positioned downstream of upstream blade sections 45A such that they slightly overlap in the axial direction. Downstream blade sections 45B are positioned slightly to the pressure side of upstream blade sections 45A such that there is a small gap between upstream blade section 45A and 45B. Platforms 119 of upstream blade sections 45A include notches 162 and 164 that conform around the leading edge portions of downstream blade sections 45B. However, in other embodiments of the present invention, downstream blade sections 45B are placed in different positions with respect to upstream blade sections 45A. For example, downstream blade sections 45B may be placed directly behind the trailing edge portions of upstream blade sections 45A such that no gaps are present. In any configuration, downstream blade sections 45B are rotatable about pivot pins 122. Accordingly, the curvature of blades 14 is altered to differentiate the pressure profile from upstream portion 45A to downstream portion 45B. For example, as downstream portions 45B are rotated clockwise as shown in FIG. 5, the curvature of blades 14 increases such that the pressure at downstream portions 45B is increased. As such, blades 14 do more work and more air is pushed through fan section 11. Accordingly, at any time during operation of engine 10, if the full-authority, digital electronic control systems of engine 10 detects surge conditions, downstream blade sections 45B can be rotated counterclockwise to increase the pressure in fan section 11 to prevent the back flow of air through engine 10. Thus, blades 12 and blades 14 are able to operate efficiently at off-point operation of engine 10.

Although the present invention has been described with reference to preferred embodiments, workers skilled in the art will recognize that changes may be made in form and detail without departing from the spirit and scope of the invention.

The invention claimed is:

1. A variable rotor blade mechanism for use in a gas turbine engine, the mechanism comprising:
    a blade rotor for rotating about an axial engine centerline during operation of the gas turbine engine;
    a blade extending radially from blade rotor and configured for rotation about a radial axis;
    a harmonic drive system mounted to the blade rotor and connected to the blade to rotate the blade about the radial axis;

a stepper motor for driving the harmonic drive with relative rotational input with respect to the rotation of the blade rotor;
a bearing assembly disposed between the stepper motor and the harmonic drive; and
a bracket disposed about the engine centerline for supporting the stepper motor stationary with respect to the rotation of blade rotor such that the relative rotational input to the stepper motor is generated.

2. The variable rotor blade mechanism of claim 1 and further comprising an actuator arm axially extending from the blade for converting the relative rotational input to the harmonic drive to rotation of the blade about the radial axis.

3. The variable rotor blade mechanism of claim 1 wherein the stepper motor comprises:
a stator coil mounted to the bracket such that it is stationary with respect to the rotation of the blade rotor and such that it circumscribes the centerline; and
a drive rotor connected to the harmonic drive and configured for rotation about the stator coil;
wherein the stator provides electrical input to the drive rotor such that the drive rotor rotates about the centerline.

4. The variable rotor blade mechanism of claim 3 wherein the stepper motor comprises stepped engagements such that the drive rotor advances in incremental steps and such that the rotor can be locked at each incremental step.

5. The variable rotor mechanism of claim 4 and further comprising a digital control device for providing electrical input to the stator coil.

6. The variable rotor blade mechanism of claim 5 wherein the stepper motor is continuously operated to drive the drive rotor with the absolute rotation of the blade rotor, or is intermittently operated to allow free rotation of the drive rotor with the absolute rotation of the blade rotor.

7. The variable rotor blade mechanism of claim 3 wherein the harmonic drive system comprises:
an annular rigid gear connected to the actuator arm and having a set of radially inward facing teeth; and
an annular flexible gear mounted to the blade rotor such that it rotates absolutely with the blade rotor, the flexible gear having a set of radially outward facing teeth engaged with the set of radially inward facing teeth;
wherein the drive rotor is disposed within the flexible gear such that relative rotation of the drive rotor with respect to the blade rotor produces rotation of the blade about the radial axis through the toothed engagement and the actuator arm.

8. A variable rotor blade mechanism comprising:
a blade rotor for rotating about an axial engine centerline during operation of the gas turbine engine;
a blade extending radially from blade rotor and configured for rotation about a radial axis;
a harmonic drive system mounted to the blade rotor and connected to the blade to rotate the blade about the radial axis;
a stepper motor for driving the harmonic drive with relative rotational input with respect to the rotation of the blade rotor;
a bracket disposed about the engine centerline for supporting the stepper motor stationary with respect to the rotation of blade rotor such that the relative rotational input to the stepper motor is generated;
an actuator arm axially extending from the blade for converting the relative rotational input to the harmonic drive to rotation of the blade about the radial axis;
a pin extending through the blade rotor;
a bore positioned at an inner diameter of the blade for receiving the pin such that the blade is rotatable about the pin; and
a radial retention system for restraining radial movement of the blade while allowing rotation of the blade about the radial axis.

9. The variable rotor blade mechanism of claim 8 wherein rotation of the blade about the radial axis by the actuation arm adjusts a pitch of the blade.

10. The variable rotor blade mechanism of claim 8 and further comprising:
an upstream blade rotor positioned upstream of the blade rotor;
an upstream blade section positioned upstream of the blade such that the upstream blade section and the blade are arranged in a two-piece airfoil configuration; and
wherein the rotation of the blade about the radial axis adjusts a camber of the two-piece airfoil configuration.

11. A variable pitch rotor blade for a gas turbine engine, the variable pitch rotor blade comprising:
a blade disk for rotating about an engine centerline during operation of the gas turbine engine;
a blade connected to the blade disk and configured for rotation about a radial axis at an outer diameter of the blade disk;
an actuator arm extending from an inner diameter end of the blade;
a bracket disposed about the engine centerline and for providing a stationary support with respect to rotation of the rotor;
a stepper motor comprising:
a stator mounted to the bracket such that it circumscribes the centerline; and
a rotor configured for rotation about the stator; and
a harmonic drive system comprising:
a flexible gear mounted to the rotor such that it rotates about the centerline with the rotor; and
a rigid gear connected to the actuator arm and engaged with the flexible gear;
wherein the rotor acts as a drive input to the flexible gear to cause relative rotation of the rigid gear about the centerline with respect to the blade disk such that the rigid gear adjusts the position of the actuator arm to adjust a pitch of the blade.

12. The variable pitch rotor blade of claim 11 wherein the rotor further comprises:
a circular inner bore configured for rotation about the stator; and
an elliptical outer diameter for providing harmonic input to the flexible gear.

13. The variable pitch rotor blade of claim 11 wherein the stepper motor comprises stepped engagements such that the rotor advances in incremental steps and such that the rotor can be locked at each incremental step.

14. The variable pitch rotor blade of claim 13 and further comprising a digital control device for providing electrical input to the stator such that the stepper motor is continuously operated to drive the rotor with rotation of the blade disk, or is intermittently operated to allow free rotation of the rotor with rotation of the blade disk.

15. The variable pitch rotor blade of claim 11 and further comprising:
a pin extending through the blade disk;
a bore positioned at an inner diameter of the blade for receiving the pin such that the blade is rotatable about the pin; and a radial retention system for restraining radial movement of the blade while allowing radial rotation of the blade.

16. A variable camber rotor blade for a gas turbine engine, the variable camber blade comprising:
   an upstream blade section mounted to an upstream rotor disk configured for rotation about an engine centerline during operation of the gas turbine engine;
   a downstream rotor disk disposed downstream of the upstream rotor disk and configured for rotation about the engine centerline during operation of the gas turbine engine;
   a downstream blade section connected to the downstream rotor disk such that the upstream blade section and the downstream blade section form an airfoil body, and wherein the downstream blade section is configured for rotation about a radial axis at an outer diameter of the downstream blade disk;
   an actuator arm extending from an inner diameter end of the downstream blade section;
   a bracket disposed about the engine centerline and for providing a stationary support with respect to rotation of the downstream rotor disk;
   a stepper motor comprising:
      a stator mounted to the bracket such that it circumscribes the centerline; and
      a rotor configured for rotation about the downstream rotor disk; and
   a harmonic drive system comprising:
      a flexible gear mounted to the downstream rotor disk such that it rotates about the centerline with the downstream rotor disk; and
      a rigid gear connected to the actuator arm and engaged with the flexible gear;
   wherein the rotor acts as a drive input to the flexible gear to cause relative rotation of the rigid gear about the downstream rotor disk such that the rigid gear adjusts the position of the actuator arm to adjust position of the downstream blade section, thereby adjusting the camber of the airfoil body.

17. The variable camber rotor blade of claim 16 wherein the rotor further comprises:
   a circular inner bore configured for rotation about the stator; and
   an elliptical outer diameter for providing harmonic input to the flexible gear.

18. The variable camber rotor blade of claim 16 wherein the stepper motor comprises stepped engagements such that the rotor advances in incremental steps and such that the rotor can be locked at each incremental step.

19. The variable pitch camber rotor blade of claim 18 and further comprising a digital control device for providing electrical input to the stator such that the stepper motor is continuously operated to drive the rotor with rotation of the downstream rotor disk, or is intermittently operated to allow free rotation of the rotor with rotation of the downstream rotor disk.

20. The variable camber rotor blade of claim 16 and further comprising:
   a pin extending through the downstream rotor disk;
   a bore positioned at an inner diameter of the downstream blade section for receiving the pin such that the downstream blade section is rotatable about the pin; and
   a radial retention system for restraining radial movement of the downstream blade section while allowing rotation of the downstream blade section about the radial axis.

* * * * *

UNITED STATES PATENT AND TRADEMARK OFFICE
CERTIFICATE OF CORRECTION

PATENT NO. : 7,901,185 B2
APPLICATION NO. : 11/709013
DATED : March 8, 2011
INVENTOR(S) : Gabriel L. Suciu and Craig A. Nordeen Page 1 of 1

It is certified that error appears in the above-identified patent and that said Letters Patent is hereby corrected as shown below:

In the Specification

Col. 6, Line 33
  Delete "aid"
  Insert -- and --

Signed and Sealed this
Fourth Day of November, 2014

Michelle K. Lee
*Deputy Director of the United States Patent and Trademark Office*